US012286340B2

(12) United States Patent
Garbe et al.

(10) Patent No.: US 12,286,340 B2
(45) Date of Patent: Apr. 29, 2025

(54) REFUELLING SYSTEM FOR MOTOR VEHICLES

(71) Applicants: Volkswagen Aktiengesellschaft, Wolfsburg (DE); Jens Staufenbiel, Coburg (DE); Markus Jakob, Coburg (DE)

(72) Inventors: Thomas Garbe, Wolfsburg (DE); Jens Staufenbiel, Lage (DE); Markus Jakob, Coburg (DE)

(73) Assignees: Volkswagen Aktiengesellschaft, Wolfsburg (DE); Jens Staufenbiel, Coburg (DE); Markus Jakob, Coburg (DE)

( * ) Notice: Subject to any disclaimer, the term of this patent is extended or adjusted under 35 U.S.C. 154(b) by 55 days.

(21) Appl. No.: 18/196,907

(22) Filed: May 12, 2023

(65) Prior Publication Data

US 2023/0286797 A1 Sep. 14, 2023

Related U.S. Application Data

(63) Continuation of application No. PCT/EP2021/080893, filed on Nov. 8, 2021.

(30) Foreign Application Priority Data

Nov. 13, 2020 (DE) ..................... 10 2020 130 075.1

(51) Int. Cl.
*B67D 7/34* (2010.01)
*B67D 7/04* (2010.01)

(52) U.S. Cl.
CPC ........... *B67D 7/342* (2013.01); *B67D 7/0401* (2013.01); *B67D 2007/0446* (2013.01)

(58) Field of Classification Search
CPC .... B67D 2007/0446; B67D 2007/0444; B67D 7/04; B67D 2005/03361; B60K 2015/03361
See application file for complete search history.

(56) References Cited

U.S. PATENT DOCUMENTS 4,821,697 A * 4/1989 McDougal ............ F02P 5/1527 123/406.3
5,979,705 A * 11/1999 Kaehler ................. B67D 7/744 141/105

(Continued)

FOREIGN PATENT DOCUMENTS

DE 102014222331 A1 5/2016
DE 102017214096 A1 8/2018

(Continued)

OTHER PUBLICATIONS

International Search Report dated Mar. 9, 2022 in corresponding application PCT/EP2021/080893.

*Primary Examiner* — Timothy P. Kelly
(74) *Attorney, Agent, or Firm* — Muncy, Geissler, Olds & Lowe, P.C.

(57) ABSTRACT

A refueling system for motor vehicles, that includes a motor vehicle with a first communication interface and with a control unit, as well as a refueling installation, a second communication interface, which has a communication connection to the first communication interface for the transmission of data, as well as a tank with a fuel. The refueling installation has a sensor device, which is equipped to determine a fuel material property of the fuel of the refueling installation and to transmit it to the motor vehicle, so that the control unit of the motor vehicle controls a vehicle component on the basis of the determined fuel material property.

7 Claims, 3 Drawing Sheets

(56) References Cited

U.S. PATENT DOCUMENTS

| | | | | |
|---|---|---|---|---|
| 6,163,738 | A | 12/2000 | Miller | |
| 9,995,230 | B2 | 6/2018 | Okamiya | |
| 11,447,387 | B2 | 9/2022 | Jost et al. | |
| 2010/0305827 | A1 * | 12/2010 | Fournel | G01M 15/108 701/102 |
| 2015/0371460 | A1 * | 12/2015 | Wenzel | G07C 5/08 701/1 |
| 2018/0112622 | A1 * | 4/2018 | Atterberry | F02D 41/3005 |

FOREIGN PATENT DOCUMENTS

| | | | |
|---|---|---|---|
| EP | 3521091 | A1 | 8/2019 |
| JP | 2009161232 | | 7/2009 |
| JP | 2011027001 | | 2/2011 |
| WO | WO2009092473 | A1 | 7/2009 |
| WO | WO2020109673 | A1 | 6/2020 |

* cited by examiner

REFUELLING SYSTEM FOR MOTOR VEHICLES

This nonprovisional application is a continuation of International Application No PCT/EP2021/080893, which was filed on Nov. 8, 2021, and which claims priority to German Patent Application No 10 2020 130 075.1, which was filed in Germany on Nov. 13, 2020, and which are both herein incorporated by reference.

BACKGROUND OF THE INVENTION

Field of the Invention

The invention relates to a refueling system for motor vehicles.

Description of the Background Art

The fuels available on the fuel market meet the necessary requirements according to standards today. However, these standards were designed for a broad spectrum, and it is impossible to take full advantage of the potential for optimization of the respective fuel with reference to the standards.

Previous concepts for optimization of use deal with fuel analysis in the motor vehicle. Simple systems, for example for deriving material properties from the dielectric constant, are already in use. More complex products are currently still under development. Efforts are underway in this regard to become more economical in production and to produce greater information content through advances in nanotechnology. In addition, efforts are being made to optimize these systems such that as much information as possible can be generated from as few individual systems as possible. Mathematical analysis methods and algorithms based on artificial intelligence, for example deep learning algorithms, can provide substantial assistance here.

At present, however, these systems are very cost-intensive, in particular since a fuel sensor system must then be provided in every motor vehicle. To make the situation worse, such individual sensor systems in the motor vehicle are limited in their analytical resolution. For example, it is scarcely possible to distinguish between paraffinic fuels and fuels from renewable sources and a premium fuel. Furthermore, environmental influences are circumvented by the displacement of the sensitive measurement devices in the process chain.

All known solution concepts result in a high cost factor for the vehicle. In addition, space is required for the sensor systems and their specific operational requirements. The latter requirements include robustness to heat and cold as well as to vibration.

In other known implementations of the prior art, information transfers between filling station and motor vehicle are communicated by way of database-supported collections of information.

WO 2009/092473 A1, for example, discloses a method for fueling motor vehicles in which information on the required fuel is transmitted to the refueling installation prior to fueling. Here, physical properties of the fuel based on previously stored fuel data are transmitted through a transmitting device of the refueling installation to a receiving device on the vehicle side in order to carry out engine settings of the motor vehicle.

In U.S. Pat. No. 9,995,230 B2, a fueling method is used in which a retrofit device is employed that transmits fuel parameters to an on-board computer system during the fueling process using an electronic fuel characterization table.

However, it is disadvantageous that the individual fuel properties in the tank of the refueling installation are not constant and can vary, and an electronic database requires ongoing updating in order to take into account the variations on relatively short time scales.

SUMMARY OF THE INVENTION

It is therefore an object of the invention to provide a refueling system that that at least alleviates the aforementioned problems, in particular has reduced costs overall, and permits up-to-date and precise adaptation of control components to the fuel that is actually employed.

In an exemplary embodiment of the invention, a refueling system for motor vehicles is provided. The refueling system comprises a motor vehicle with a first communication interface and with a control unit. In addition, the refueling system comprises a refueling installation with a second communication interface, which has a communication connection to the first communication interface for the transmission of data, as well as a tank with a fuel. In addition, the refueling installation comprises a sensor device, which is equipped to determine a fuel material property of the fuel of the refueling installation and to transmit it to the motor vehicle by means of the communication interfaces. The control unit of the motor vehicle is additionally equipped to control a vehicle component on the basis of the fuel material property determined by the sensor device.

To phrase it another way, the sensor device is a part of the refueling installation or is integrated or incorporated therein. In other words, the sensor device is a sensor unit or a sensor system. A fuel material property, or in other words a fuel parameter, can be a physical or chemical property. Preferred examples are a density, a viscosity, a dielectric constant, or an oxygen content, wherein the invention is not limited thereto, and can include other specific fuel parameters. A vehicle component can be an engine, so that the fuel-adapted control relates to engine management. A vehicle component can also relate to other controllers such as, e.g., exhaust-gas aftertreatment, auxiliary heating, activated-carbon filter regeneration, or subordinate control units. A fuel material property can include a measure for quality, sustainability, type, and composition of the fuel.

The invention has the advantage that the vehicle does not have to provide any integrated sensors. The transmitted fuel material property is always up to date in this case and is not subjected to variations or changes over time. Moreover, this also means that the transmitted fuel material property is accurate or precise, since it is obtained through actual measurements on the fuel, compared with the use of previously stored parameter sets in databases, which by definition cannot be up-to-date and require continuous updating. As a result, moreover, these fuel material properties do not have to be independently tested by the filling station operator and be stored in databases or uploaded. The refueling system therefore makes it possible to precisely optimize the motor vehicle or components thereof for the fuel to be filled. Moreover, the durability of the motor vehicle or of its vehicle components can be improved markedly through the accurate adaptation to the fuel. This results from the customized optimization to the fuel.

Preferably, the sensor device can be a spectroscopic measuring instrument. Possibilities include, for example, fluorescence spectroscopy, light absorption spectroscopy by means of UV (ultraviolet), VIS (visible), NIR (near infrared), or IR (infrared), as well as dielectric spectroscopy, wherein miniaturized NMR spectroscopy (nuclear magnetic resonance) or XRF spectroscopy (X-ray fluorescence analysis) are also possible in this application, wherein the invention is not restricted thereto. The fuel material property is determined nondestructively and accurately by the spectroscopic methods. Moreover, there is available space in the refueling installation in order to arrange the devices in such a manner that a precise measurement can take place. In addition, the determination of a multiplicity of fuel parameters is feasible.

The refueling installation can comprise a fuel-pump nozzle, in other words a hose nozzle, and a line between tank and fuel-pump nozzle or hose nozzle, wherein the sensor device is positioned in such a way and equipped so as to determine the fuel material property of the fuel in the line or at the fuel-pump nozzle. As a result, the fuel material property can be determined during the fueling process, since the fuel has already been pumped up into the line. The line is a run in other words. The fuel-pump nozzle is, in other words, a hose nozzle or a fuel nozzle.

The sensor device can be positioned in such a way and equipped so as to determine the fuel material property of the fuel in the tank of the refueling installation. It is advantageous in this case that fuel properties of a static fluid can be measured. As a result, therefore, a fuel parameter can also be precisely determined before or after the actual fueling process. In further examples, a combination of the positionings at the tank and/or the fuel-pump nozzle and/or the line can also be carried out.

The sensor device can be equipped to perform a dating of the fuel, to identify a renewability measure of the fuel on the basis of the dating, and to transmit this to the motor vehicle by means of the communication interfaces. To this end, the sensor device can also comprise a separate or integrated measuring module, for example in addition to a spectroscopy measuring instrument, in order to carry out this determination. The sensor device can thus include a sensor group. The sensor device can preferably carry out a carbon-14 dating in this case. By means of the renewability measure, in other words a sustainability measure, the degree of sustainability of the fuel can be determined. This information can be used for selecting the fuel, for example. Fossil fuels have a high age here, whereas renewable fuels have a low age. A renewability measure would reflect this age relationship. Furthermore, the renewability measure can also be the identified age itself. Such information on sustainability or on the renewable nature may be or become necessary for certain motor vehicles or for all motor vehicles.

The control unit can be equipped to control a fuel intake quantity to the motor vehicle on the basis of the fuel material property determined by the sensor device. This makes it possible for the vehicle to select an appropriate fuel. A selection signal can be sent to the refueling installation through the communication interface in response to the communication of the fuel, for example. For example, only one specific quality value, in particular according to a renewability measure, can be used for a motor vehicle, in particular. Another criterion can be engine compatibility. The control of the intake quantity can also include total blocking. The blocking can also take place at the vehicle inlet without communication to the refueling installation.

The control unit can be equipped to control the fuel intake quantity to the motor vehicle additionally on the basis of a fill quantity in a vehicle fuel tank and the fuel material property in the motor vehicle of a fuel located therein. A fuel material property of the combined fuel can be determined from these parameters. This knowledge can be used in turn to determine a suitable intake quantity. For example, a maximum delivery quantity of a low-grade fuel can be determined for which the properties of the combined fuel are still assessed as appropriate.

For example, the control unit can be equipped to determine a degree of mixture separability of the fuel of the vehicle fuel tank and the fuel of the tank of the refueling installation on the basis of the fuel material property determined by the sensor device and the fuel material property of the fuel of the vehicle fuel tank and the fill quantity in the vehicle fuel tank, and, on the basis of the degree of mixture separability, to control the fuel intake quantity and/or to control a mixing device for mixing. If there are differences in material between two fuels, in particular in the case of renewable fuels that differ from one another, particularly in relevant fuel material properties, undesirable mixture separation can occur in the vehicle fuel tank. In that case, a homogeneous mixture is not formed, for example in the vehicle fuel tank, but instead a first phase and a separate second phase. In order to prevent this, applicable fuels can be blocked or their addition can be proportioned or limited. A mixing device, for example a fuel pump, can also be switched on in order to produce homogeneity.

The control unit can be equipped to determine a maximum delivery quantity, and to control the fuel delivery in such a manner that the delivered fuel intake quantity corresponds to the maximum delivery quantity. This is especially appropriate when only low compatibility is present, a danger of mixture separation exists, or the combined fuel material property does not meet quality requirements.

The control unit can be equipped to adjust a service interval for a vehicle component of the motor vehicle on the basis of the transmitted fuel property. For example, an oil change interval or a fuel filter replacement interval can be adapted to the quality of the fuel, since fuel is entrained in the motor oil and the fuel filters are degraded by the determined fuel material properties. As a result, the durability of the motor vehicle can be extended.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
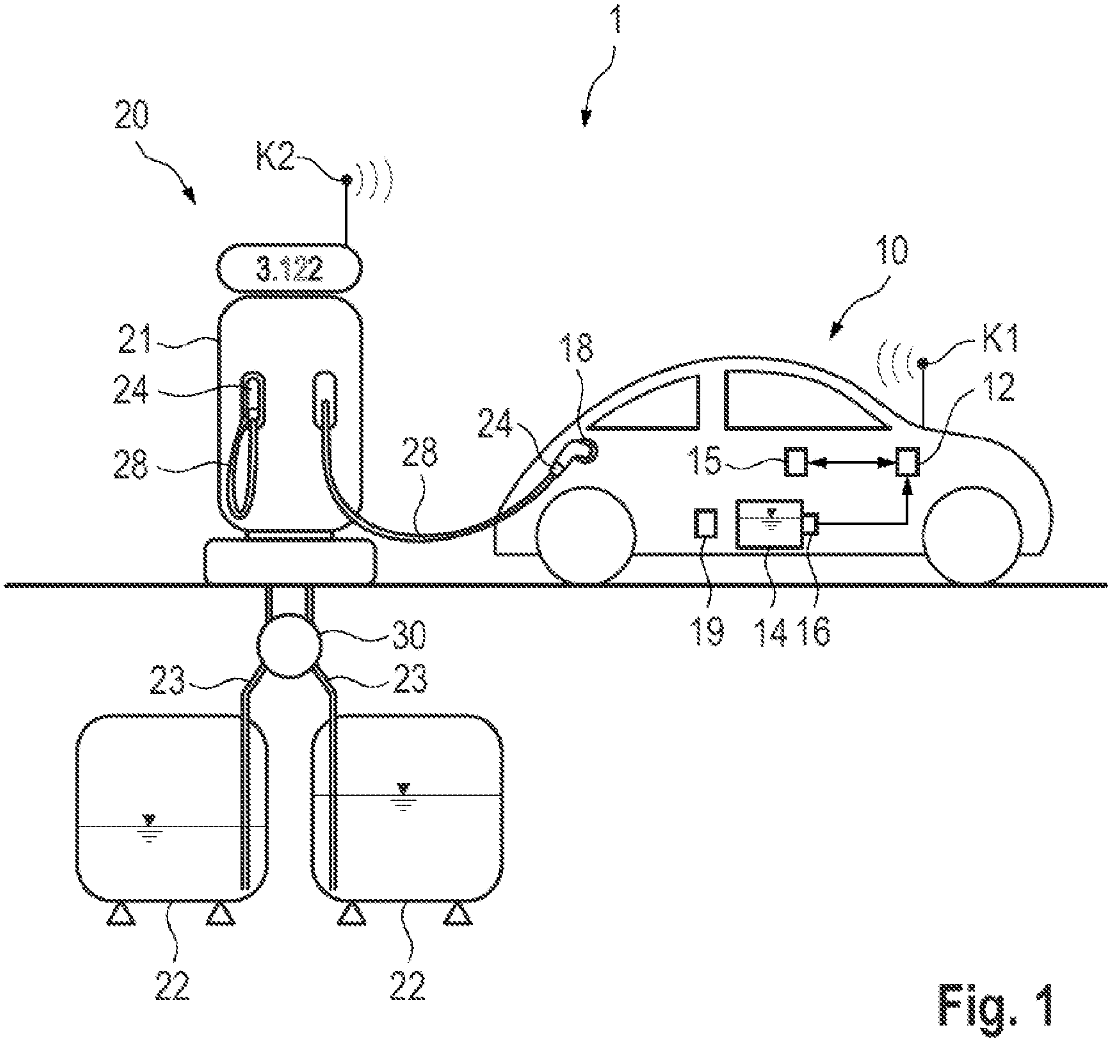
FIG. 1 is a refueling system according to the invention.
Figure 2:
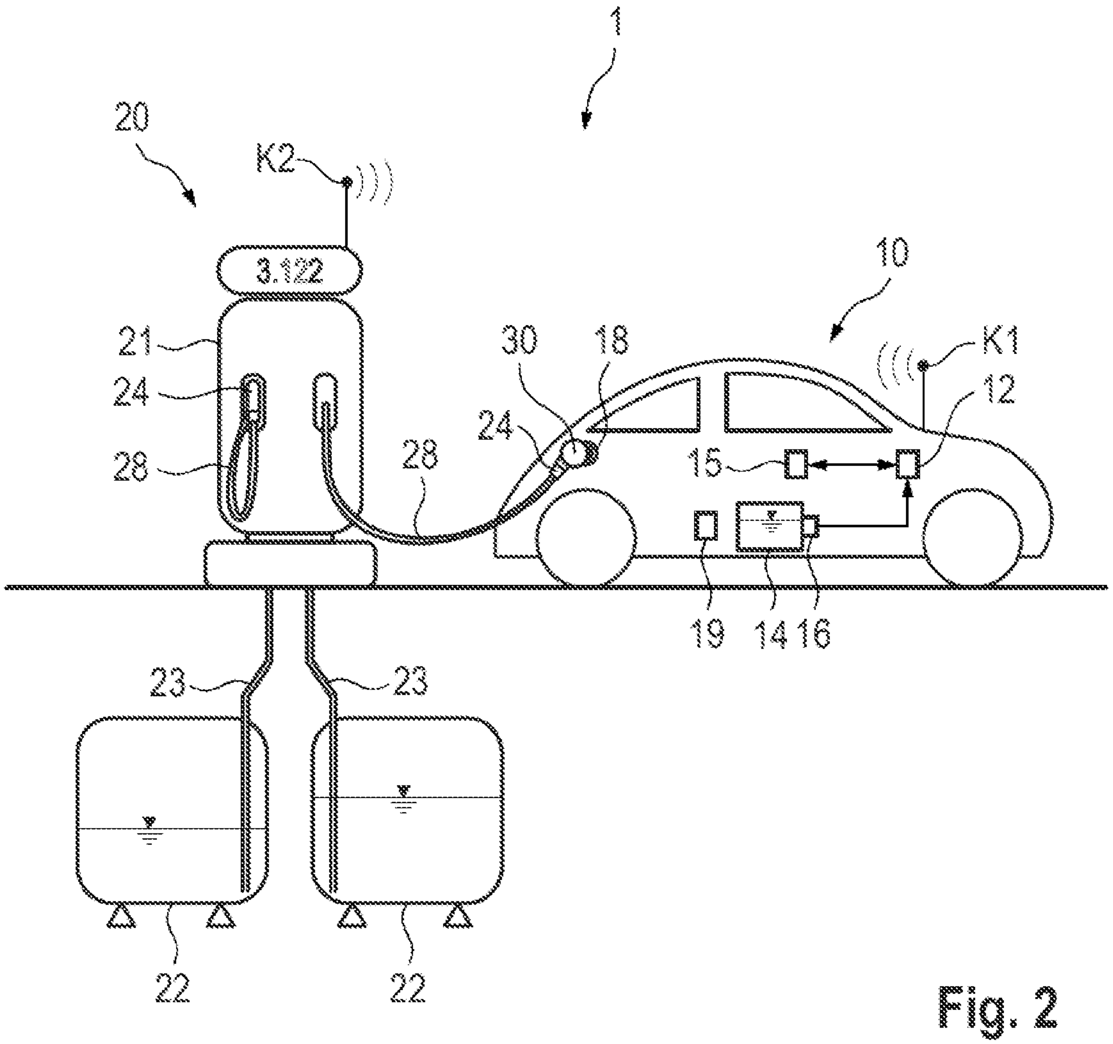
FIG. 2 is a refueling system according to the invention.
Figure 3:
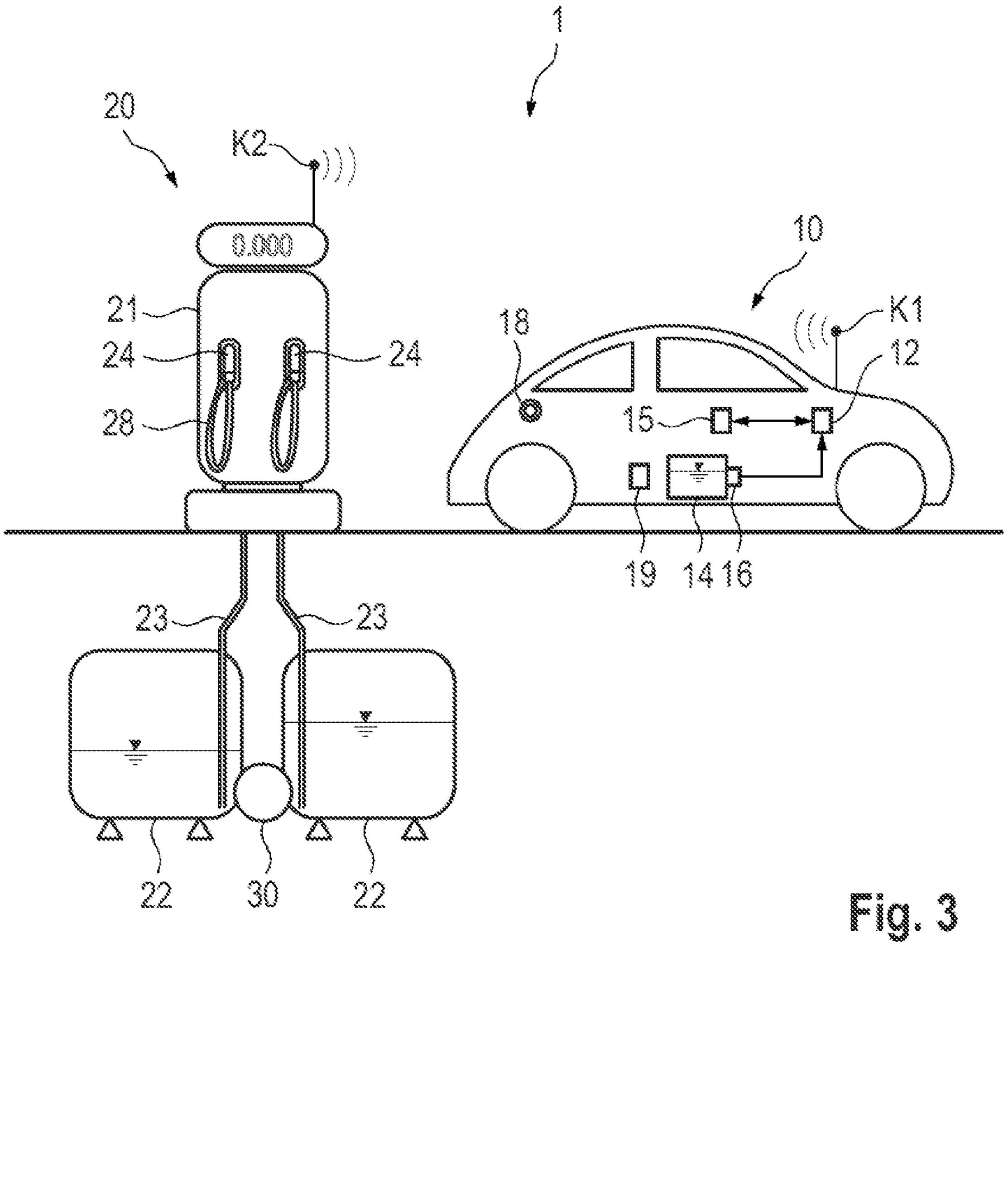
FIG. 3 is a refueling system according to the invention.

FIG. 1 shows a refueling system 1 according to a first example of the invention. FIGS. 2 and 3 show additional examples of the refueling system, which will be discussed in detail at a suitable point, wherein the shared features of these embodiments are included in the description hereinbelow.

The refueling system 1 includes a motor vehicle 10, wherein all motor vehicles are covered by the invention, and not solely passenger cars as shown in the figures. The motor vehicle 10 includes a first communication interface K1. The first communication interface K1 can be located at various, suitable positions of the motor vehicle 10. Furthermore, the motor vehicle 10 includes a control unit 12. The control unit 12 in this case can be an on-board control system, which is to say, for example, a central controller. An on-board control system can include networked control units and/or control modules, for example. However, the control unit 12 can also be an individual control unit that executes a particular control task of the motor vehicle.

The refueling system 1 further comprises a refueling installation 20 for fueling a motor vehicle 10. The refueling installation 20 in this case can typically include a fuel pump 21 with a fuel hose 28 connected thereto and with a fuel-pump nozzle 24.

The refueling installation 20 further comprises a second communication interface K2. The second communication interface K2 has a communication connection to the first communication interface K1 for the transmission of data. The communication, which is to say the sending of data, can take place in both directions in this case. The transmission can take place over data lines or wirelessly. Preferably, Bluetooth can be used. Bluetooth can be used, without retrofitting, by the communications equipment that often is already incorporated in the radio. Bluetooth has the advantage that the radio signals can be directed or selective, so that only a certain motor vehicle 10 communicates with the refueling installation 20. The manufacturer consequently has no extra construction costs with the use of hardware components already incorporated in the motor vehicle.

Alternatively, data transmission can also take place by NFC (near field communication) or WLAN. Alternatively, a data line can also be used, which ensures a maximum possible transmission security.

The refueling installation 20 further comprises a tank 22, or multiple tanks 22, for a fuel. A tank 22 can preferably be located underground in this case, which is to say be implemented as a buried tank, wherein the invention is not limited thereto. As shown in the illustration by way of example, multiple tanks 22, each of which stores a certain fuel in the tank 22, can belong to a refueling installation 20. To phrase it another way, the tanks can differ in at least one fuel material property, and the fuel material property can also be variable over time.

The refueling installation 20 further comprises a sensor device 30, which is to say the sensor device 30 is incorporated or integrated in the refueling installation 20. The sensor device 30 is positioned in such a way and equipped so as to determine a fuel material property of the fuel of the refueling installation 20, for example all fuels of the refueling installation 20. A fuel material property can be, for example, a density, an oxygen content, a renewability measure such as an age, a fuel type, a fuel quality, etc. Fundamentally, the fuel material property is a physical or chemical property of the fuel. Volatility or cold flowability can also be included.

The determined fuel material property is transmitted to the motor vehicle 10 over the communication interfaces K1, K2. In addition, operating instructions for the engine, the exhaust-gas aftertreatment system, an auxiliary heating system, or other functionalities can be transmitted, for example EGR (exhaust gas recirculation) variation with simultaneous shifting of the injection point, adaptation of the regeneration of the exhaust-gas aftertreatment system and oil change intervals.

The control unit 12 of the motor vehicle 10 can receive this fuel material property over the first communication interface K1. In response, the control unit 12 can control a vehicle component on the basis of the fuel material property determined by the sensor device 30. A vehicle component can be, for example, the engine. In other cases, it can be other control functions in the motor vehicle 10. In this context, "control" refers, in particular, to an adapting or adjusting of the vehicle component to the fuel material property of the measured fuel.

The transmitted fuel material property is always up-to-date owing to the integrated sensor device 30, so that the transmitted fuel material property is accurate or precise, since it has been obtained through actual, direct measurement of the fuel. The motor vehicle 10, on the other hand, does not require any costly sensor devices. As a result, there is also no need for regular updating of databases to take place. The refueling system 1 therefore makes it possible to precisely optimize the motor vehicle 10 or components thereof for the fuel to be filled. The customized properties of each fuel can thus enter into the operation of the motor vehicle 10 in an optimized manner.

Furthermore, when there is a remaining quantity in the vehicle fuel tank 14, a combined fuel material property can be determined. This can be accomplished by the means that the fuel material property of the previously filled fuel is read out from a memory 15, in which the previously determined fuel material property was stored. In addition, a fill level sensor 16 can be provided that determines the fill level of the vehicle fuel tank 14. After obtaining these parameters, the control unit 12 can determine a combined fuel material property on the basis of the fuel material properties and the fill level. This combined property can, in turn, be stored in the memory 15 for the next refueling process. Consequently, the setting or controlling of the vehicle component can take place on the basis of such a combined fuel material property, and thus while taking into account the remaining quantity of fuel in the vehicle fuel tank 14.

The sensor device 30 can additionally include a spectroscopic measuring instrument. Fuel material properties can be precisely determined with such sensor devices, for which there is typically too little space in the motor vehicle 10. Fluorescence spectroscopy, light absorption spectroscopy, or also dielectric spectroscopy are preferred, wherein the invention is not limited thereto. In particular, a nondestructive determination of fuel parameters can take place in this way. For example, a combination of permittivity measurements and near-infrared measurements can take place. In other possibilities, molecular elucidation of, e.g., renewable proportion, aromatics content, paraffin content, polarity index, and molecule size distribution, e.g., state of aging, can be detected.

The refueling installation 20 preferably comprises a fuel-pump nozzle 24, also referred to as hose nozzle or fuel nozzle, and a line 23 between tank 22 and fuel-pump nozzle 24. The sensor device 30 can now be positioned differently with respective advantages, with reference being made here to FIGS. 1-3, which differ essentially only in the positioning of the sensor device 30. In other examples, it is also possible to use multiple sensor devices 30, which are located, for example, at several or all of the different positions in FIGS. 1-3. Consequently, the explanations for FIGS. 1-3 can each be combined with one another in their entirety.

In FIG. 1, the sensor device 30 is positioned in such a way and equipped so as to determine the fuel material property of the fuel in a line 23, also referred to as a run, between a fuel-pump nozzle 24 and the tank 22. The sensor device 30 can also be integrated within the fuel pump 21 in this case.

In FIG. 2, the sensor device 30 is positioned in such a way and equipped so as to determine a fuel material property at the fuel-pump nozzle 24, wherein this also includes a determination just after fuel-pump nozzle 24.

These locations in FIGS. 1 and 2 are suitable, in particular, for determining the fuel material property of the fuel to be filled during the fueling process, see the Figure in this regard. Then the fuel material property can be determined during passage through the line 23 and fuel-pump nozzle 24, for example by a pump mechanism, and transmitted to the motor vehicle 10 through the communication interfaces K1, K2.

In another example, as shown in FIG. 3, the sensor device 30 can be positioned in such a way and equipped so as to determine the fuel material property of the fuel in the tank 22 of the refueling installation 20. By this means, a static measurement of the fuel to determine the fuel material property is advantageously accomplished. Furthermore, a measurement can, in particular, be determined as early as before, or also after, the fueling process by this means, see the Figure in this regard. In addition, the measurement can take place at a bypass, if one is present. The various positions of the control modules 30 can be combined with one another to good advantage in other examples.

On account of the available space in the refueling installation 20, the sensor device 30 can also, in addition or alternatively, be equipped to perform a dating of the fuel. A renewability measure of the fuel can then be determined by means of the dating. To this end, a separate measuring module or an integrated measuring module can be provided in the sensor device 30. The sensor device 30 can accordingly also include a sensor group for this purpose, which is to say, for example, a spectroscopic measuring instrument and dating module. The sensor device 30 can preferably carry out a carbon-14 dating in this case. Such a state of aging can be essential for the operational reliability of the engine, especially in hybrid technology.

The renewability measure can be transmitted to the motor vehicle 10 by means of the communication interfaces K1, K2. The motor vehicle 10 thus obtains information about the sustainability of the fuel. The invention then also makes it possible, for example, for the renewability measure combined with other fuel material properties to be transmitted to the motor vehicle 10.

For example, a minimum amount of sustainability can also be required for a motor vehicle 10. This information can then be used for selecting the fuel, for example by blocking or activating certain fuels. Furthermore, the renewability measure can also be the identified age itself.

The control unit 12 can furthermore control a fuel intake quantity to the motor vehicle 10 on the basis of the fuel material property determined by the sensor device 30. Control here includes comprises the blocking or also the activating of an inlet, which is to say the enabling or inhibition of delivery and/or minimization of delivery or amount of the admitted fuel quantity. For example, the information on sustainability, which is to say the identified renewability measure or the identified age, can be used in order to check whether quality requirements on the fuel are satisfied and, if necessary, the inflow can be blocked or reduced. The control of the fuel quantity or of the intake can take place at a fuel inlet 18 of the motor vehicle 10, on the one hand, or alternatively through the transmission of a control signal to the refueling installation 20 through the communication interfaces K1, K2, for example at a fuel-pump nozzle 24 or another valve of the refueling installation 20.

In addition, the control unit 12 can control the fuel intake quantity to the motor vehicle 10 on the basis of the fill quantity in the motor vehicle fuel tank 14 and the fuel material property in the vehicle fuel tank 14 of the fuel located therein. This makes it possible to check the compatibility of the fuels and, if applicable, to reduce or to refuse a delivery.

In particular, provision is advantageously made that the control unit 12 determines a degree of mixture separability of the fuel of the vehicle fuel tank 14 and the fuel of the tank 22 of the refueling installation 20 on the basis of the fuel material property determined by the sensor device 30 and the fuel material property of the fuel of the vehicle fuel tank 14 and the fill quantity in the motor vehicle fuel tank 14. Then it is possible to control the fuel intake quantity on the basis of the degree of mixture separability. Consequently, it is advantageously possible to take into account that undesirable mixture separation can occur in the vehicle fuel tank 14 in the case of different fuels, especially in the case of renewable fuels. The determination of a maximum delivery quantity can prevent a phase separation from occurring in the vehicle fuel tank 14.

Furthermore, a mixing device 19, for example a pump, can also be operated for mixing on the basis of the degree of mixture separability. In this way, multiphase fuel components, common in biofuels, can be homogenized. This can take place, as already explained above, on the basis of the determination of mixture separability.

A maximum delivery quantity can also take place on the basis of the fuel material property determined by the sensor device 30 and the fuel material property of the fuel of the vehicle fuel tank 14 and the fill quantity in the motor vehicle fuel tank 14. Then the fuel delivery can be controlled in such a manner that the delivered fuel intake quantity corresponds to the maximum delivery quantity. For example, a mixture separation may not take place until a certain delivery quantity, while the mixture remains homogeneous below that quantity. In that case, this maximum delivery quantity can prevent a mixture separation. In other examples, this can be used in order to add a low-grade fuel up to a maximum amount while complying with quality requirements.

The control unit 12 can furthermore adjust a service interval for a vehicle component of the motor vehicle on the basis of the transmitted fuel property. For example, an oil change interval can be adapted on the basis of the fuel material property transmitted by the sensor device 30. For example, an oil change interval can be increased in the case of a high-grade fuel and reduced in the case of a low-grade fuel. Furthermore, the replacement interval for a particulate filter of an exhaust-gas aftertreatment system can be shortened or extended. In these cases, the operation of the motor vehicle 10 can be optimized.

In additional examples of the invention, a fuel material property can be detected on the basis of the detection of chemical tracers in the fuel. A chemical tracer is a fuel marker in other words. A synthetic DNA, additive packages, and/or fuel identification markers, for example, can be implemented as chemical tracers. Specific, defined instructions from the manufacturer can then be transmitted to the vehicle on account of the recognized fuels. To this end, the sensor device 30 can include a spectroscopic measuring instrument, for example a fluorescence spectroscopic measuring instrument, that identifies the tracer by means of characteristic fluorescence in a one-to-one correspondence. The transmitted fuel material property can either be the information about the tracer itself or the associated fuel material property. By means of the tracer, high-grade fuels, for example, can thus be identified or additional parameters can be read from corresponding databases. This solution for identifying tracers can be combined with the above-described exemplary embodiments.

In another example of the invention, the motor vehicle 10 can also transmit data, for example vehicle information, to the refueling installation 20 by means of the communication interfaces K1, K2 with the refueling installation 20, for example prior to measurement by the sensor device 30. In this example, the refueling installation 20 has a control unit.

For example, an engine characteristic or other information can be transmitted to the refueling installation. The refueling installation 20 or the control unit 12 can then select, which is to say, e.g., enable or block, a tank 22 or a fuel-pump nozzle in response to the transmitted vehicle information. For example, the control unit can activate tanks 22 or fuel-pump nozzles 24 with fuels matching the vehicle information and/or block non-matching fuels. For example, a motor vehicle 10 with a gasoline engine may encounter only blocked diesel fuel-pump nozzles. Furthermore, all incompatible fuel mixtures can also be blocked on the basis of a transmission of the fill level and the fuel property of the fuel in the tank. Consequently, misfueling or the filling of fuel properties that are harmful to the engine can be avoided. Additional information, such as a state of the vehicle, e.g., full particulate filter, critically clogged high-pressure feed pump, can be transmitted so that the refueling installation 20 or its control unit can initiate fuel actions such as, for instance, selection of the optimal fuel, subsequent additive treatment, or blending of the fuel. Optionally, in this case the driver can be informed of this action at the fuel pump 21, at another location, or by means of an app. Another aspect of the invention can include that motor vehicles subject to existing emissions requirements, e.g., for operation in city centers, are supplied with fuels in a targeted manner.

A blocking of all fossil fuels could come into consideration in the case of a motor vehicle approved only for renewable fuels.

In additional examples of the invention, the information exchanged between motor vehicle 10 and refueling installation 20 can be forwarded to suitable servers. Possible applications are to ensure measures to reduce greenhouse gases and/or pollutants. These can be transmitted in clear text, anonymized, pseudoanonymized, or aggregated.

The invention has advantages including that the motor vehicle 10 does not have to provide any integrated sensors, but instead obtains the accurate and up-to-date fuel properties through the refueling installation 20. The transmitted fuel material property is precise, since it is obtained through actual measurement on the fuel by an incorporated or integrated sensor device 30, and consequently a precise adaptation to the fuel to be filled is made possible or a suitable fuel selection can be made in all embodiments as well.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A refueling system for a motor vehicle, the refueling system comprising:
- a motor vehicle comprising:
  - a first communication interface; and
  - a control unit;
- a refueling installation comprising:
  - a second communication interface, which has a communication connection to the first communication interface for the transmission of data;
  - a tank with a fuel; and
  - a sensor device configured to determine a fuel material property of the fuel of the refueling installation and to transmit the fuel material property to the motor vehicle via the first and second communication interfaces,
- wherein the control unit of the motor vehicle is configured to control a vehicle component on the basis of the fuel material property determined by the sensor device,
- wherein the control unit is configured to control a fuel intake quantity to the motor vehicle based on the fuel material property determined by the sensor device, and
- wherein the control unit is additionally configured to control the fuel intake quantity to the motor vehicle based on a fill quantity in a vehicle fuel tank of the motor vehicle and a fuel material property of a fuel already located in the vehicle fuel tank of the motor vehicle.

2. The refueling system according to claim 1, wherein the sensor device comprises a spectroscopic measuring instrument.

3. The refueling system according to claim 1, wherein the sensor device is positioned and configured so as to determine the fuel material property of the fuel in the tank of the refueling installation.

4. A refueling system for a motor vehicle, the refueling system comprising:
- a motor vehicle comprising:
  - a first communication interface; and
  - a control unit;
- a refueling installation comprising:
  - a second communication interface, which has a communication connection to the first communication interface for the transmission of data;
  - a tank with a fuel; and
  - a sensor device configured to determine a fuel material property of the fuel of the refueling installation and to transmit the fuel material property to the motor vehicle via the first and second communication interfaces,
- wherein the control unit of the motor vehicle is configured to control at least one vehicle component on the basis of the fuel material property determined by the sensor device, and
- wherein the sensor device is configured to perform a dating of the fuel and/or to identify a renewability measure of the fuel based on the dating, and to transmit the dating of the fuel and/or the renewability measure of the fuel to the motor vehicle via the first and second communication interfaces.

5. The refueling system according to claim 1, wherein the control unit is configured to determine a degree of mixture separability of the fuel already located in the vehicle fuel tank of the motor vehicle and the fuel of the tank of the refueling installation based on the fuel material property determined by the sensor device, the fuel material property of the fuel already located in the vehicle fuel tank of the motor vehicle and the fill quantity in the motor vehicle fuel tank, and, wherein, based on the degree of mixture separability, the control unit is configured to control the fuel intake quantity and/or to control a mixing device for mixing.

6. The refueling system according to claim 1, wherein the control unit is configured to determine a maximum delivery quantity, and to control a fuel delivery such that the fuel intake quantity corresponds to the maximum delivery quantity.

7. A refueling system for a motor vehicle, the refueling system comprising:

a motor vehicle comprising:

a first communication interface; and a control unit;

a refueling installation comprising:

a second communication interface, which has a communication connection to the first communication interface for the transmission of data;

a tank with a fuel; and a sensor device configured to determine a fuel material property of the fuel of the refueling installation and to transmit the fuel material property to the motor vehicle via the first and second communication interfaces, wherein the control unit of the motor vehicle is configured to control at least one vehicle component on the basis of the fuel material property determined by the sensor device, and wherein the control unit is configured to adjust a stored service interval of the vehicle component of the motor vehicle based on the fuel material property determined by the sensor device.

* * * * *